Nov. 13, 1962  E. F. YENDALL  3,063,247
LOW TEMPERATURE PURIFICATION OF AN IMPURITY-CONTAINING GAS
Filed Nov. 7, 1958  3 Sheets-Sheet 1

INVENTOR
EDWARD F. YENDALL
BY *William F. Mesinger*
ATTORNEY

INVENTOR
EDWARD F. YENDALL
BY William F. Mesinger
ATTORNEY

United States Patent Office 3,063,247
Patented Nov. 13, 1962

3,063,247
LOW TEMPERATURE PURIFICATION OF AN IMPURITY-CONTAINING GAS
Edward F. Yendall, Kenmore, N.Y., assignor to Union Carbide Corporation, a corporation of New York
Filed Nov. 7, 1958, Ser. No. 772,550
19 Claims. (Cl. 62—13)

This invention relates to an improved process of and apparatus for low temperature purification of a low-boiling impurity containing compressed gas, and more particularly to the removal of low boiling impurities from a compressed air or crude hydrogen stream.

It is well known to purify a gas by cooling to low temperature whereby an impurity deposits as a solid on the heat transfer surface. In order that such a process may operate for extended periods without interruption it is common practice to provide duplicate passages for the gas to be purified. Periodically the gas is switched to an alternate clean passage so that the deposits may be removed from the vacated passage by means of a counter-flowing cold purge gas. By such operation it is possible to inhibit the accumulation of deposits so that the function of the heat transfer units is not unduly impaired over extended periods of time.

A difficulty often encountered in such processes is that of providing an adequate quantity of cold gas in the system for purging, for such purge gas may be rendered useless as a result of being contaminated by the evaporated deposits. It is usually found necessary to divert a portion of the pure product gas for this purpose, and it is obvious that such practice constitutes a direct loss of clean product capacity of the process.

An example is the purification of hydrogen for metallurgical purposes where certain objectionable impurities are removed at low temperatures by deposition on heat transfer surfaces. A portion of the cold purified hydrogen is used for purging, and since the purge hydrogen is thus recontaminated by the evaporated deposits it must either be discarded or further processed to a usable condition.

Another example is air separation by rectification where air under pressure, e.g. below about 150 p.s.i.g., is cooled and cleaned by heat exchange with uncompressed separation products in a reversible heat transfer zone. The zone may comprise heat exchangers of the accumulator or passage exchanging types, and water and carbon dioxide deposited from the air in one passage of the zone are subsequently evaporated and purged by a portion of the products. In this application the difference in the heat capacities of the compressed air and the uncompressed products tends to produce an excessively large temperature difference at the cold end of the heat exchange zone. This reduces the capacity of the colder purge gas for evaporating the deposits at any level in the exchanger, with the result that a large percentage of the total product is required to remove the impurities as rapidly as they are deposited. Large amounts of purge gas are required in spite of the use of so-called flow unbalance procedures for reducing the cold end temperature difference. Flow unbalance procedures are well known to those skilled in the art and include such methods as air side bleed and air or product recirculation.

Assuming that a favorable cold end $\Delta T$ pattern is established, as for example by air side bleed from the heat exchange zone, the heat exchange zone should be self-cleaning provided that a sufficient volume of outflowing gas is available for purging the reversing passageways. Often the entire nitrogen product, i.e. 80% of the air volume, is employed as purge gas, and the total oxygen product i.e. 20% of the air, is withdrawn as clean gas through non-reversing passageways. By liberal design and proper operation of a conventional air separation plant, the total proportion of clean products not required for purge may be greater than 20%, and a total equal to 50% of the air has been found attainable. However, when the amount of clean products desired is substantially greater than 50% of the air volume, the problem of providing a sufficient quantity of purge gas becomes critical. To a limited extent, the problem of recovering increased amounts of clean products may be met by further reducing the heat exchange zone cold end $\Delta T$, as for example, by adding more heat transfer area or by unbalancing the flows to a greater degree. However, neither of these measures are economical because they require greater investment in equipment.

It has also been proposed to increase the pressure of the inlet air in order to improve passage cleaning. Raising the air pressure increases the absolute volume difference between the incoming air and a given mass of outgoing uncompressed purge gas, and this is favorable to the evaporation of deposits. The adverse effects of greater heat capacity difference may be overcome by more flow unbalance so that the net result is beneficial rather than detrimental to passage cleaning. However, air compression represents a large part of the total operating cost of air separation plants and it is unecomonical to increase the air pressure solely to accommodate cleaning in the reversing heat transfer zone.

An object of the present invention is to provide an improved process of and apparatus for low temperature cleaning of low-boiling impurity-containing gas.

Another object of the present invention is to provide an improved process of and apparatus for purifying a gas stream in which a smaller mass of purge gas is required to remove the low-boiling impurities deposited in the reversible heat exchange zone, thereby facilitating a higher recovery of impurity-free product gas.

These and other objects and advantages of this invention will be apparent from the following description and accompanying drawings in which:

FIGURE 1 is a schematic flow diagram of a low-temperature gas mixture cleanup system according to the present invention, in which a passage exchanging heat exchanger comprises the reversible heat exchange zone;

FIGURE 2 is a schematic flow diagram of a low-temperature gas mixture cleanup system similar to FIGURE 1, but modified so that cold accumulator type units comprise the reversible heat exchange zone;

In the drawings similar items of apparatus in the several figures are designated by similar reference numerals.

Figure 3:
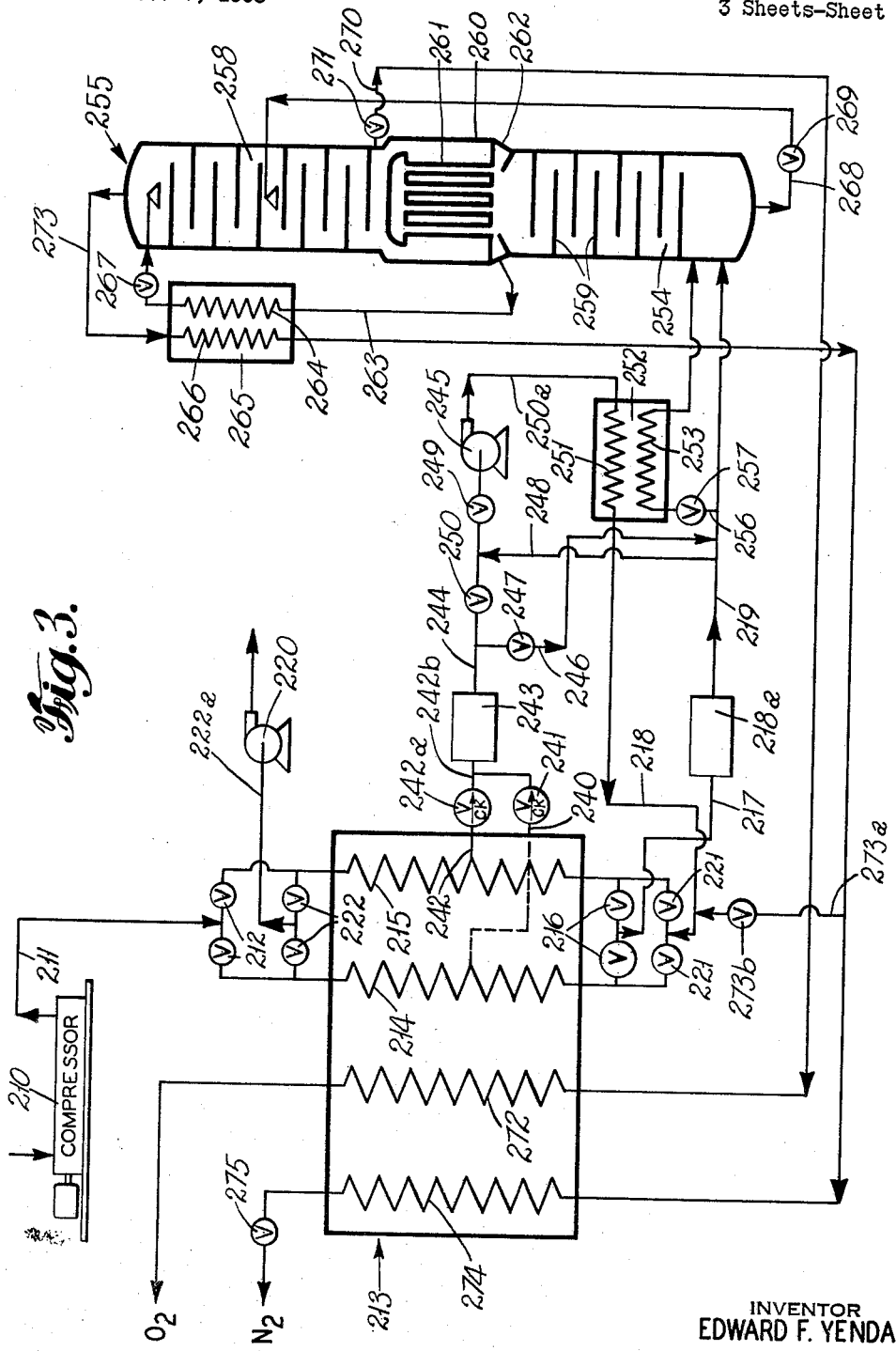
FIGURE 3 shows a schematic flow diagram of an air separation system incorporating an air purification system of the present invention.

According to the present invention, the mass of purge gas required for cleaning the heat exchange zone may be reduced substantially by decreasing its pressure. At subatmospheric pressures and a given temperature, the amount of low-boiling impurities evaporated by a unit volume of purge gas has been found to be essentially independent of the purge gas density. This means that a sufficient volume of purge gas can be obtained from a very small mass of purge gas. For example, by reducing the absolute pressure of the purge gas stream by one-half, the same cleaning function can be performed with one-half the mass of purge gas. Furthermore, the purge gas pressure may be reduced below atmospheric pressure without aggravating the $\Delta T$ problem in the cold end of the reversible heat exchange zone. This is because the rarified gas behaves more nearly ideal, and its specific heat does not change appreciably between 0–1 atmosphere absolute pressure within the temperature range of most reversing heat transfer processes. Stated in another way, the difference in the specific heats of the inlet gas stream and the purge gas will be about the same with a purge pressure of 0.5 atmosphere as with a purge pressure of 1.0 atmosphere.

In accordance with one embodiment of the present invention, a compressed gas stream containing the low-boiling impurities is provided and passed to a reversible heat exchange zone where it flows countercurrently to a cold, clean fluid or product stream. As a gas cleanup stroke, at least part of such inlet gas stream is cooled in a first reversing passageway to a temperature below the deposition point of the low-boiling impurities thereby depositing such impurities in the passageway. The warm compressed inlet gas stream is subsequently transferred to a second reversing passageway in the reversible heat exchange zone for cooling and impurity deposition therein. As a gas exhaust stroke, a cold purge gas stream provided at the cold end of such zone is drawn at sub-atmospheric pressure through the first reversing passageway in opposite flow direction to the previously passed inlet gas stream. The sub-atmospheric pressure purge gas stream evaporates the previously deposited impurities in the first reversing passageway for removal from the heat exchange zone, thereby establishing the desired self-cleaning condition. The cold, clean product stream is at least at atmospheric pressure and flows in a separate passageway out of direct contact with the deposited impurities and in indirect heat exchange relation to the inlet gas stream so as to cool such inlet gas stream. The compressed inlet gas stream and the purge stream are periodically interchanged between the reversing passageways in the reversible heat exchange zone for alternate impurity deposition and impurity evaporation in each reversing passageway.

The cleaned, cold compressed gas stream discharged from the reversible heat exchange zone may be passed to a consuming device or further processed as desired. The cold sub-atmospheric pressure purge stream and the cold clean product stream supplied at least at atmospheric pressure may be derived from the compressed gas stream or alternatively provided from independent sources. If the cleaned gas stream is a gas mixture and is to be subsequently separated into its gas components, the separation system usually constitutes the source for the purge gas and the cold clean product streams. In the case of a low-temperature air separation system the oxygen and nitrogen components or parts thereof may comprise these streams, and the component or component portions serving as the cold clean fluid stream may be recovered as impurity-free product.

The cold purge stream is normally available at above atmospheric pressure, and the sub-atmospheric pressure is preferably applied to such stream by means such as a rotary suction-blower or compressor connected to the waste gas manifold at the warm end of the reversible heat exchange zone so that the sub-atmospheric pressure is applied alternately to the duplicate reversing passageways. Also, if the reversible heat exchange zone is connected to a rectification column, a pressure reducing device is provided in the conduit between these components. The function of this device is to exclude the sub-atmospheric pressure from the main rectification zone and from any other liquid-vapor phase change in the process which produces a material effect on the gas inlet pressure to the plant. This is advantageous for several reasons. For example, in the case of a two-stage air separation column, if the vacuum is imposed on the product producing column, all of the air separated component streams withdrawn therefrom must be vacuum pumped. This would entail unnecessary investment and operating expense since only the relatively small purge stream need be vacuum pumped. Furthermore, if the column is under a vacuum, the column shell must be extremely thick and heavy to avoid collapse due to external pressure. Also, the design of the column rectification trays would be greatly complicated in order to avoid excessively high vapor velocity through the rays. Another disadvantage is that if a vacuum is imposed on the condenser-reboiler of a two stage air separation column, the pressure on the condenser side, i.e. the air head pressure, must be correspondingly reduced by a factor of about three-fold in order to maintain a low economical temperature difference across the condenser-reboiler. The corresponding reduction in head pressure cancels out any cleaning benefit to the reversible heat exchange zone resulting from drawing the vacuum on the reversing passageways. The same effect would result from imposing the vacuum on an auxiliary condenser or on any other boiling-condensing process which similarly affects the head pressure.

As previously discussed, an important advantage of vacuum purging a reversible heat exchange zone according to the present invention is that it provides a method of reducing the required mass of purge gas to obtain the desired self-cleaning conditon, thereby increasing the mass of cold product gas that may be passed through uncontaminated passages of the heat exchange zone and discharged as impurity-free product gas. For example, in the case of an air separation system, this invention permits an increase of clean product recovery from about 50% of the inlet air to 80% or above. Thus, it is possible to simultaneously produce substantial quantities of high purity nitrogen and high purity oxygen and recover the refrigeration from such streams in the heat exchange zone without impurity contamination therein.

In an impurity cleanup system in which clean product gases are obtained from the inlet gas and returned through the reversible heat exchange zone, the fraction of product component gases which can be recovered through non-reversing passes depends upon the degree of vacuum which is maintained on the purge gas stream; that is, a higher vacuum permits a higher percent recovery of clean product. Consequently, if the desired fraction of clean products varies, the degree of vacuum may be adjusted accordingly so as to maintain a self-cleaning heat exchange system. This self-cleaning condition will exist if the vacuum applied to the purge gas stream, expressed as atmospheres absolute pressure, is numerically less than the approximate ratio of the available purge gas volume to the purge gas volume which would be required at a pressure of one atmosphere absolute, both volumes being measured at standard conditions.

It is to be understood that practicing the present invention is also advantageous even though a relatively high recovery fraction of clean gas from the heat exchange zone is not required. In such a case, vacuum pumping of the purge gas stream permits operation of the reversible heat exchange zone with a larger cold end temperature difference, which condition permits the heat exchangers to be made smaller, or the amount of flow unbalance to be reduced.

Referring now to the drawings and particularly to FIGURE 1, a gas stream is compressed in compressor 10 to a pressure of less than about 150 p.s.i.g., the heat of compression being preferably removed by, for example, a water-cooled exchanger (not shown). The compressed gas stream passes through conduit 11 and reversing valves 12 to a reversible heat exchange zone 13 which comprises a reversing heat exchanger of the type well-known to those skilled in the art. The inlet gas stream is cooled in either first or second reversing passageways 14 and 15, respectively, to a temperature below the deposition point of the low boiling impurities thereby depositing such impurities in the passageway. In the case of air, this temperature may be about −173° C. The cold, cleaned gas stream is discharged from zone 13 through either of cold end reversing valves 16 into conduit 17 for consumption or further processing as desired. A cold, purge gas stream is provided in conduit 18, and if the source of such gas is at least at atmospheric pressure and if variations in the source pressure produce strong effects on the inlet gas pressure or otherwise are detrimental to efficient operation, then pressure reducing means 19 may be provided to isolate such source from the vacuum. Although pressure reducing means 19 is illustrated as a valve, it is to be understood that other means of flow restriction or a work expander could be used instead. The purge gas in conduit 18 is then drawn by vacuum pump 20 through either of cold end reversing valves 21 into the reversing passageway 14 or 15 through which the compressed inlet gas is not flowing. The sub-atmospheric pressure purge gas stream thus flows countercurrent to, and in heat exchange relation with the cooling inlet gas stream, and simultaneously evaporates the previously deposited low-boiling impurities for removal from the heat exchange zone 13 through warm end reversing valves 22. The warmed impurity-containing purge gas stream is drawn through conduit 22a and is recompressed by vacuum pump 20 to a pressure facilitating its disposal to the atmosphere or further use as desired. A cold, product gas stream is provided at least at atmospheric pressure in conduit 23 at the cold end of heat exchange zone 13 and passed through non-reversing passageway 24 in counter-current direction to, and in heat exchange relation with the cooling inlet gas stream in reversing passageway 14 or 15. The warmed impurity-free gas stream is discharged from zone 13 at the warm end thereof into conduit 23 for further use as desired. It is to be noted that the refrigeration of the product gas stream is recovered by the inlet gas stream, but that the former retains its impurity-free state and does not contact the impurities deposited in the heat exchange zone by such inlet gas stream.

FIGURE 2 illustrates another embodiment of the present invention utilizing cold accumulators instead of reversing heat exchangers in the reversible heat exchange zone. Such regenerators are provided in pairs, piped in parallel, and contain regenerative packing 129 as an intermediate refrigeration storage means for operation in a manner well-known to those skilled in the art, as described in U.S. Patent No. 1,890,646 to M. Fränkl. The compressed inlet gas stream passes alternately through the packed beds of accumulators 130 and 131 for cooling and impurity deposition therein, and the resulting cooled and cleaned compressed gas stream is discharged through either of cold end check valves 116 into conduit 117. Simultaneously, another accumulator in the set is being cleaned by passage therethrough of purge gas having been drawn at sub-atmospheric pressure into the accumulator cold end through conduit 118 and either of cold end check valves 121 by vacuum pump 120. Work expander 119 is provided as a pressure reducing means. A cold product gas stream is provided in conduit 123 and flows through coils 124 embedded in regenerative packing 129 in a direction countercurrent to the flow of compressed inlet gas. The cold product stream absorbs heat from the regenerative packing during the purge stroke and it may also absorb heat from the compressed inlet gas during the compressed gas stroke. Both the purge gas and the product stream are warmed by passage through the accumulators to temperatures approaching that of the inlet compressed gas.

The inlet gas and purge gas stream flows are alternated between the packed beds of regenerators 130 and 131 in a manner well-known to those skilled in the art. The purge gas stream may be drawn through the packed beds under a vacuum during the entire exhaust stroke, or only during the first part of such stroke. In the case of heat exchangers of the recuperative type the impurities are evaporated and removed from the packed bed at the highest rate during the first part of the purge stroke. Also, since the majority of the impurities are expelled from the packed bed during the first part of the exhaust stroke, a cold product gas stream may be passed through such bed during the remainder of the exhaust stroke without substantial contamination by the remaining impurities. Thus, if the purity requirements for the product gas stream are not too high, embedded coils 124 may be eliminated. In this event the cold, product gas stream could enter conduit 118 through conduit 125 and control valve 126 therein. Alternatively, only one instead of two cold gas streams may be supplied to the cold end of heat exchange zone 113, and such stream may, for example, be discharged from the warm end to the atmosphere as warmed impurity-containing vacuum pumped gas during the first part of the exhaust stroke and recovered as impurity-free product gas at higher pressure during the remainder of such stroke.

FIGURE 3 illustrates an air separation system incorporating one gas cleanup embodiment of the present invention, in which cold, cleaned air serves as the purge gas stream, while oxygen and nitrogen streams separated in the rectification column perform the function of the aforedescribed cold product gas stream and are recovered from the warm end of the reversible heat exchange zone as impurity-free products. Referring now more specifically to FIGURE 3, the major portion of a compressed air inlet stream is cooled and cleaned in either of reversing passageways 214 and 215, and a minor portion or side-bleed air stream is withdrawn from such passageways through conduits 240 and 242 containing check valves 241 and 242a, respectively. The side-bleed stream is withdrawn at an intermediate temperature level e.g. —100° C., which is preferably above the deposition point of the low-boiling impurities, and thus bypasses a portion of the inlet air stream around the colder part of the reversible heat exchange zone 213. This provides the desired degree of flow unbalance for reducing the cold end ΔT in heat exchange zone 213 and for increasing the cleaning capacity of a given volume of purge gas. Providing flow unbalance reduces the mass of purge gas and/or the degree of vacuum required, and therefore it lends flexibility permitting operation with best economy.

The partially cooled minor air portion from conduit 240 or 242 is conducted through passageway 242b to adsorption trap 243 for removal of the low-boiling impurities still dissolved in the air by a suitable adsorbent such as silica gel. The cleaned side-bleed air stream is discharged from trap 243 into conduit 244. Although only one trap 243 is illustrated, a duplicate trap may be provided and piped in parallel so that when one gel trap becomes loaded with air impurities, the side-bleed air may be directed to the other adsorption trap having previously been purged and reactivated by means not illustrated.

Returning now to the major portion of the air stream, most of its low-boiling impurities are removed by deposition in the colder part of zone 213, and such portion is discharged through either of cold end reversing valves 216 at approximately —173° C. into conduit 217, and thence passes to cold end adsorption trap 218a for silica gel filtration and adsorption of any residual low-boiling impurities not previously removed. The impurity-free cold end air is discharged from silica gel trap 218 into conduit 219.

The quantity and temperature of the cleaned side-bleed stream in conduit 244 are preferably adjusted in a manner described in copending U.S. Serial No. 677,606, filed August 12, 1957, now Patent No. 2,984,079 in the name of W. H. Lauer et al. to obtain optimum conditions for efficient work expansion in turbine 245. This is accomplished by diverting a portion of the cleaned side-bleed air through conduit 246 and control valve 247, and diverting a portion of the colder clean main air portion from conduit 219 through conduit 248 to the side-bleed stream in conduit 244, the latter flow being controlled by valve 249. The side-bleed air in conduit 244 is slightly throttled through valve 250 to obtain flow in the desired direction through conduit 248. The adjusted, air side-bleed stream is then work expanded through turbine 245 to a sub-atmospheric pressure, and drawn through conduit 250a and passageway 251 of heat exchanger 252 where it is countercurrently warmed by diverted cold end air in passageway 253. The resulting further warmed and expanded side-bleed air is then discharged into conduit 218 and drawn as purge gas by vacuum pump 220 through either of cold end reversing valves 221 into reversing passageway 214 or 215. The impurities deposited therein are evaporated and withdrawn from the heat exchange zone 213 in the warmed purge air through either of warm end reversing valves 222, conduit 222a and vacuum pump 220 for discharge to the atmosphere or further processing as desired. In case the mass of work expanded air is somewhat less than the optimum mass of purge gas, a portion of one of the products, e.g. nitrogen, may be diverted through conduit 273a and throttling valve 273b into conduit 218 to augment the purge gas stream.

The cold and cleaned major portion of the air stream in conduit 219 is passed into the base of the higher pressure chamber 254 of a two-stage rectification column 255 for partial liquefaction and separation therein. A minor part of such major portion is diverted from conduit 219 through conduit 256 and control valve 257 to passageway 253 of heat exchanger 252 for warming the work expanded sub-atmospheric pressure side-bleed air in passageway 251. The further cooled and partially liquefied diverted minor air part is then passed through conduit 256 into the base of higher pressure rectification chamber 254 for separation therein along with the undiverted major portion of the air stream. Rectification column 255 operates in a manner well-known to those skilled in the art, and includes the previously mentioned higher pressure chamber 254 and a lower pressure rectification chamber 258. The two chambers 254 and 258 contain liquid-vapor contact means such as trays 259, and are joined by condenser-reboiler section or main condenser 260. Nitrogen-rich vapor reaching the top of higher pressure chamber 254 rises into tubes 261 for condensation by lower pressure liquid oxygen boiling in the shell side of main condenser 261. A portion of the condensed nitrogen-rich liquid falls back into the higher pressure chamber 254 to serve as reflux liquid for the rising vapor, while the remaining nitrogen-rich liquid is collected on shelf 262. The latter is withdrawn through conduit 263 and directed to passageway 264 of heat exchanger 265 where it is subcooled by the countercurrently flowing nitrogen effluent gas in passageway 266. The subcooled nitrogen-rich shelf liquid is then throttled through valve 267 and passed into the top of lower pressure chamber 258 as reflux liquid therefor. The oxygen-enriched liquid reaching the bottom of higher pressure chamber 254 is withdrawn through conduit 268, throttled through valve 269, and introduced into lower pressure chamber 258 at an intermediate level thereof as liquid feed.

Two product gases are discharged from lower pressure rectification chamber 258, one being an oxygen fraction which is withdrawn from the base of such chamber through conduit 270 and control valve 271 therein. The oxygen gas is directed to the cold end of reversible heat exchange zone 213 where it enters non-reversing passageway 272 and flows in countercurrent heat exchange relation with the inlet compressed air stream being cooled in either of reversing passageways 214 and 215. The thus warmed impurity-free oxygen product gas is discharged through conduit 270 for use as desired. Nitrogen-rich gas, the other air separation product, is discharged from the top or dome of lower pressure chamber 258 into conduit 273 and directed to passageway 266 in heat exchanger 265 where it is superheated and simultaneously subcools the shelf-transfer liquid flowing countercurrently in passageway 264. The superheated nitrogen gas is then conducted through conduit 273 to the cold end of heat exchange zone 213 where it enters non-reversing passageway 274. The partially warmed nitrogen gas also flows in countercurrent heat exchange relation with the inlet air stream in either of reversing passageways 214 and 215, and is discharged from the warm end of zone 213 through control valve 275 as an impurity-free nitrogen product.

Figure 4:
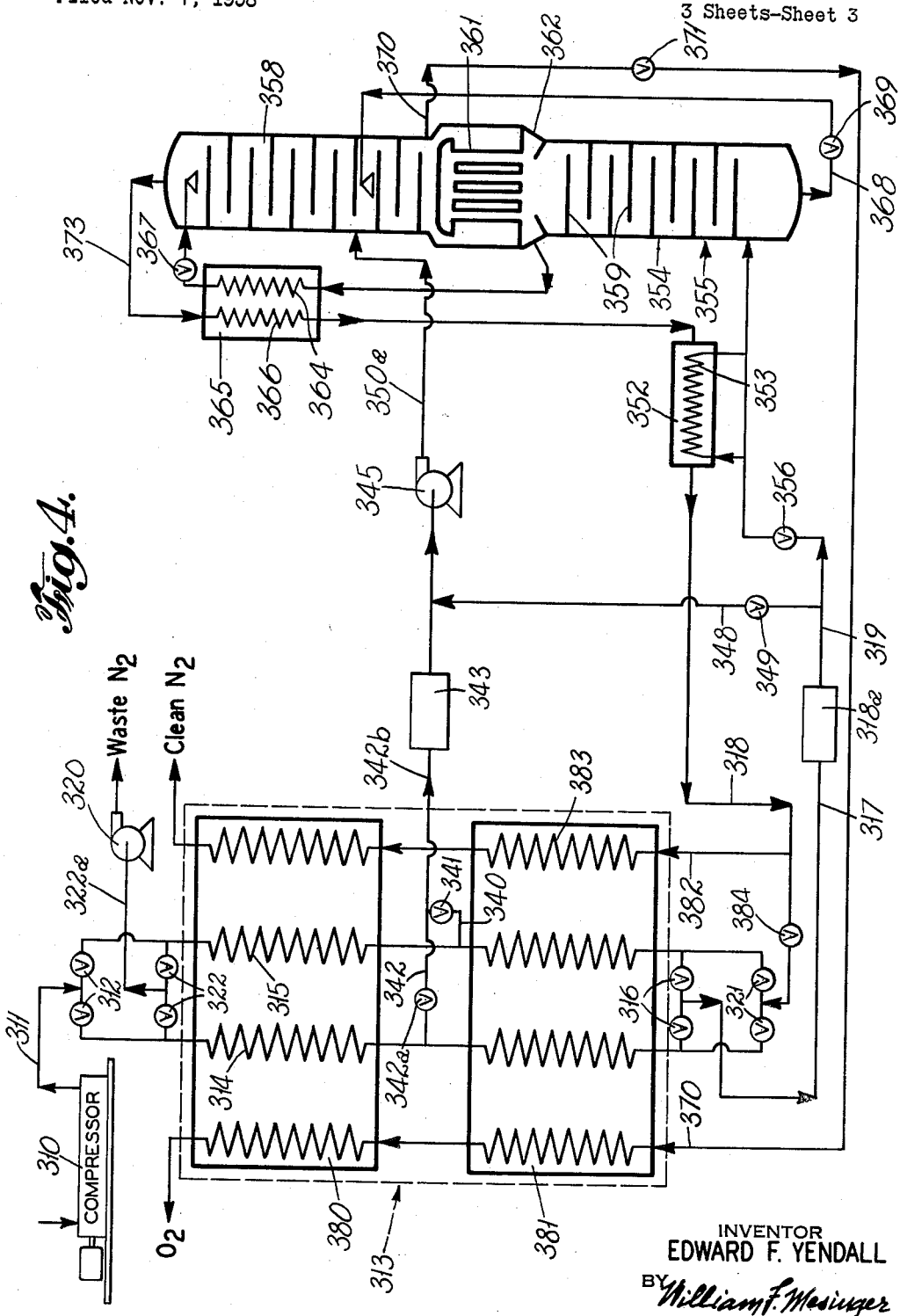
FIGURE 4 is a schematic flow diagram of a modified air separation system.

FIGURE 4 illustrates an air separation system incorporating another gas purification embodiment of the present invention, in which a portion of the nitrogen product serves as the purge gas stream while the oxygen product and the remainder of the nitrogen product act as the aforedescribed cold product gas streams and are recovered from the warm end of the reversible heat exchange zone as impurity-free products. Referring now more specifically to FIGURE 4, heat exchange zone 313 is divided into two sections, a warm leg 380 and a cold leg 381, and a minor air portion is diverted through conduit 342 between the two legs to aid self-cleaning, as previously described. The side-bleed air is cleaned in adsorption trap 343, and augmented by cold end air which is diverted from conduit 319 through conduit 348 and control valve 349 therein so as to form an air stream of proper temperature and quantity for work expansion through turbine 345 to satisfy the cycle's low-temperature refrigeration requirements. The expanded and cooled air is then passed through conduit 350a to an intermediate level of lower pressure chamber 358 for separation into oxygen and nitrogen components. The nitrogen effluent gas is discharged from the top of lower pressure chamber 358 into conduit 373 and directed through passageway 366 of heat exchanger 365 for partial superheating therein. If desired the nitrogen effluent may be further superheated for example in heat exchanger 352 against a diverted part of the major air portion in passageway 353. The superheated nitrogen is then passed to the cold end of cold leg 381 where it is divided into two parts, one of which is directed through non-reversing passageway 383 of the cold and warm legs in countercurrent heat exchange relation with the inlet air. The resulting warmed nitrogen is discharged from the warm end of heat exchange zone 313 as an impurity-free product gas. The remainder of the nitrogen effluent in conduit 373 is throttled through valve 384 to sub-atmospheric pressure and drawn through either of cold end reversing valves 321 into reversing passageway 314 or 315 for removal of the air impurities deposited therein. The impurity-laden nitrogen purge gas is then drawn out of the heat exchange zone 313 through warm end reversing valves 322 by vacuum pump 320, and may be discharged to the atmosphere. If desired, the portion of the nitrogen gas used for purging may be discharged separately from the lower pressure rectification chamber 358 at a level several trays below the clean product nitrogen withdrawal level, and the two streams may be separately passed respectively to the reversing passages and to passage 383 of the heat exchange zone 313. Alternatively, all or a portion of the oxygen product may be used for purging instead of nitrogen. If only a portion of the oxygen product is used for purging, then the purge fraction may, if desired, be withdrawn from the column at a lower purity than the fraction warmed in a non-reversing passageway.

Although the preferred embodiments have been described in detail, it is contemplated that modifications of the process and apparatus may be made and that some features may be employed without others, all within the spirit and scope of the invention as set forth herein. Also, the invention is applicable to other low-boiling impurity containing gases in addition to air.

What is claimed is:

1. A process for the low-temperature purification of a low-boiling impurity-containing compressed gas stream comprising the steps of providing a gas stream at the warm end of a reversible heat exchange zone; as a gas cleanup stroke, passing at least part of the inlet gas stream alternately through first and second reversing passageways in such zone and cooling such stream to a temperature below the deposition point of the low-boiling impurities thereby depositing such impurities in the reversing passageways; providing a cold purge gas stream at the cold end of the heat exchange zone; as a gas exhaust stroke, drawing the cold purge stream at sub-atmospheric pressure through the reversing passageway vacated by the inlet gas stream and in opposite flow direction thereto so as to evaporate the previously deposited low-boiling impurities therein for removal from the heat exchange zone; periodically switching the inlet gas and purge gas flows between the first and second reversing passageways; providing a cold product stream of at least atmospheric pressure at the cold end of the heat exchange zone, said cold product stream being derived from the cooled and cleaned inlet gas stream and constituting more than about 50% by volume of the inlet gas stream; passing such product stream through the zone in indirect countercurrent heat exchange relation with the inlet gas stream to cool such stream; discharging the warmed product stream from the warm end of said zone in the impurity free state.

2. A process according to claim 1 for the low-temperature purification of a low-boiling impurity-containing gas stream, in which air constitutes said gas stream, and separated air components comprise the purge gas stream and the product gas.

3. A process according to claim 1 for the low-temperature purification of a low-boiling impurity containing gas stream, in which air constitutes said gas stream, cold cleaned air constitutes the purge gas stream, and at least one separated air component constitutes the product gas.

4. A process according to claim 1 for the low-temperature purification of a low-boiling impurity containing gas stream, in which air constitutes said gas stream, and separated air components comprise the purge gas stream and the product gas, wherein the vacuum to be applied to the purge gas stream, expressed as atmospheres absolute pressure, is numerically less than the approximate ratio of the available purge gas stream volume to the purge gas stream volume which would be required at a pressure of one atmosphere absolute to completely remove the low-boiling impurities deposited in the reversing passageway during the gas cleanup stroke, the gas volumes being measured at standard conditions.

5. A process according to claim 1 for the low-temperature purification of a low-boiling impurity containing gas stream, in which the cold, clean purge gas stream is alternately drawn through the first and second reversing passageways at sub-atmospheric pressure during the entire gas exhaust stroke.

6. A process according to claim 1 for the low-temperature purification of a low-boiling impurity containing gas stream, in which the cold, clean purge gas stream is alternately drawn through the first and second reversing passageways at sub-atmospheric pressure during the first part of the gas exhaust stroke, and at least at atmospheric pressure during the remaining part of such stroke.

7. A process according to claim 1 for the low-temperature purification of a low-boiling impurity containing gas stream, in which the cold, clean purge gas stream is alternately drawn through the first and second reversing passageways at sub-atmospheric pressure during the first part of the gas exhaust stroke so as to reevaporate and remove at least most of the impurities deposited therein, and such purge stream is alternately passed through such passageways at least at atmospheric pressure during the remaining part of the gas exhaust stroke for recovery as a substantially clean product gas.

8. A process according to claim 1 for the low-temperature purification of a low-boiling impurity containing gas stream, in which said cold purge gas stream is provided at above atmospheric pressure and reduced to sub-atmospheric pressure prior to passage through said reversible heat exchange zone.

9. A process according to claim 1 for the low-temperature purification of a low-boiling impurity containing gas stream, in which said cold purge gas stream is provided at above atmospheric pressure and throttled to sub-atmospheric pressure prior to passage through said reversible heat exchange zone.

10. A process according to claim 1 for the low-temperature purification of a low-boiling impurity containing gas stream, in which said cold purge gas stream is provided at above atmospheric pressure and expanded to sub-atmospheric pressure with the production of external work prior to passage through said reversible heat exchange zone.

11. A process according to claim 1 for the low-temperature purification of a low-boiling impurity containing gas stream, in which the cold clean purge gas stream is alternately drawn through the first and second reversing passageways at sub-atmospheric pressure during the first part of the gas exhaust stroke, and the cold product gas stream is alternately passed through such reversing passageways during the remaining part of the gas exhaust stroke for recovery as a substantially clean product gas.

12. A process for the low-temperature purification of impurity-containing compressed air comprising the steps of providing an air stream at an inlet pressure below about 150 p.s.i.g.; passing such inlet air to a reversible heat exchange zone; as a gas cleanup stroke, passing at least part of the compressed inlet air alternately through first and second reversing passageways in such zone and cooling such inlet air to a temperature below the deposition point of the low-boiling impurities thereby depositing such impurities in the reversing passageways; passing at least part of the cold, clean air stream to a rectification zone and therein separating such air into at least oxygen and nitrogen product components; withdrawing the component gases from the rectification zone at a product pressure that is at least atmospheric; passing at least a first part of said component gases being more than about 50% by volume of said inlet air through at least one non-reversing passageway in said reversible heat exchange zone at about said product pressure in heat exchange relation with the compressed inlet air stream thereby cooling such inlet air stream; discharging the thus warmed first part of the component gases from the heat exchange zone as an impurity-free product; reducing the pressure of a second part of said component gases to sub-atmospheric; and as a gas exhaust stroke, drawing such second component gas part alternately through the first and second reversing passageways at sub-atmospheric pressure immediately after the inlet air stream has ceased flow therethrough and in countercurrent direction thereto so as to evaporate the previously deposited low-boiling impurities therein for removal from the heat exchange zone in such second component gas part.

13. A process according to claim 12 for the low-temperature purification of impurity-containing air, in which the component gases withdrawn from the rectification zone include at least a nitrogen stream and an oxygen stream, a first part of the nitrogen stream being passed through one non-reversing passageway as a first portion of said first part of the component gases, a second part of said nitrogen stream being drawn alternately through the first and second reversing passageways at sub-atmospheric pressure as said second component gas part, and the oxygen stream being passed through a second non-reversing passageway in the heat exchange zone in heat exchange relation with the inlet air as a second portion of said first part of the component gases for recovery as a warm impurity-free product gas.

14. Apparatus for the low-temperature purification of low-boiling impurity-containing compressed gas including a reversible heat exchange zone having at least two reversing passageways and at least one non-reversing passageway, each of which is in heat exchange relation with the other passageways; means for supplying a pressurized inlet gas stream and passing same to the first reversing passageway for cooling of at least part of such inlet gas to a temperature below the deposition point of the low-boiling impurities thereby depositing such impurities in the passageway; means for periodically diverting the warm inlet gas mixture between said first reversing passageway and a second reversing passageway for cooling and impurity deposition therein; means for providing a cold purge gas stream at the cold end of the reversible heat exchange zone; means for alternately drawing such purge gas stream through the first and second passageways in countercurrent direction to the inlet gas stream flow at sub-atmospheric pressure after the inlet gas has ceased flow therethrough so as to evaporate the previously deposited low-boiling impurities therein for removal from the heat exchange zone in such purge gas; means for deriving from the cooled and cleaned inlet gas stream, a cold product gas stream at least at atmospheric pressure at the cold end of the heat exchange zone and constituting more than about 50% by volume of the inlet gas stream and passing such stream through the non-reversing passageway so as to cool such inlet gas stream and discharge the product gas stream as an impurity-free warm product gas.

15. Apparatus according to claim 14 for the low-temperature purification of low-boiling impurity containing compressed gas, in which the cold purge gas providing means supply such gas at above atmospheric pressure and means are provided for reducing the pressure of such gas to sub-atmospheric.

16. Apparatus according to claim 15 for the low-temperature purification of low-boiling impurity containing compressed gas, in which throttling means comprise the means for reducing the pressure of the cold purge gas stream to sub-atmospheric.

17. Apparatus according to claim 15 for the low-temperature purification of low-boiling impurity containing compressed gas, in which a work expander comprises the means for reducing the pressure of the cold purge gas stream to sub-atmospheric.

18. Apparatus according to claim 16 for the low-temperature purification of low-boiling impurity containing compressed gas, in which said means for alternately drawing the purge gas stream through the first and second reversing passageways comprises a gas pump at the heat exchange zone warm end which increases the purge gas pressure from said sub-atmospheric pressure to at least atmospheric pressure.

19. Apparatus for the low-temperature purification of low-boiling impurity containing compressed air including a reversible heat exchange zone having at least two reversing passageways and at least one non-reversing passageway, each of which is in heat exchange relation with the other passageways; means for supplying an air stream at an inlet pressure below 150 p.s.i.g. and passing same to the first reversing passageway for cooling of at least part of such inlet air to a temperature below the deposition point of the low-boiling impurities thereby depositing such impurities in the passageway; means for periodically diverting the warm inlet air between said first reversing passageway and a second reversing passageway for cooling and impurity deposition therein; a rectifying column and means for passing at least part of the cooled impurity-free air stream to such column for separation into at least oxygen and nitrogen component gases; means for discharging such component gases from the column at above atmospheric pressure; means for reducing the pressure of at least a first minor part of said component gases to sub-atmospheric; means for alternately drawing such sub-atmospheric component gas through the first and second passageways as a purge stream in countercurrent direction to the inlet air stream after such inlet air has been diverted therefrom so as to evaporate the previously deposited low-boiling impurities therein for removal from the heat exchange zone in such purge stream; means for passing a second part of said component gases at least at atmospheric pressure through said non-reversing passageway so as to cool such stream and discharge the component gas second part as an impurity-free warm product.

References Cited in the file of this patent

UNITED STATES PATENTS

| | | |
|---|---|---|
| Re. 19,267 | Van Nuys | Aug. 7, 1934 |
| 1,626,345 | Le Rouge | Apr. 26, 1927 |
| 2,089,558 | Karwat | Aug. 10, 1937 |
| 2,504,051 | Scheibel | Apr. 11, 1950 |
| 2,552,560 | Jenny | May 15, 1951 |
| 2,585,912 | Buschow | Feb. 19, 1952 |
| 2,653,455 | Etienne | Sept. 29, 1953 |
| 2,655,796 | Rice | Oct. 20, 1953 |
| 2,697,922 | Schilling | Dec. 28, 1954 |
| 2,753,701 | Palmer | July 10, 1956 |
| 2,881,595 | Petterman | Apr. 14, 1959 |